Patented Aug. 1, 1944

2,354,909

UNITED STATES PATENT OFFICE 2,354,909

PREPARATION OF β-ALANINE AMIDE BY REDUCTION OF CYANOACETAMIDE

Gustaf H. Carlson, Pearl River, N. Y., assignor to Lederle Laboratories, Inc., New York, N. Y., a corporation of Delaware No Drawing. Application June 19, 1941,
Serial No. 398,811

8 Claims. (Cl. 260—534)

This invention relates to catalytic processes and more particularly relates to an improved method for the preparation of β-amino-propionamide by the catalytic reduction of cyanoacetamide and hydrolysis of the β-aminopropionamide to β-alanine (β-aminopropionic acid).

It has been known in the past that aliphatic nitriles could be converted to the corresponding aliphatic amines by catalytic hydrogenation or reduction methods. These prior methods for catalytically reducing nitriles comprise passing hydrogen through a mixture made up of the nitrile or a solution of the nitrile in an inert solvent and a suspension of a metallic catalyst in a liquid medium. The hydrogenation usually is carried out under pressure, the mixture being agitated during the introduction of the hydrogen until absorption of hydrogen is complete. For example, the German Patent No. 597,305 describes a method for catalytically reducing cyanoacetamide by such a process, the process being carried out in the presence of sulfuric acid. When such a process is employed for catalytically reducing cyanoacetamide the yields of β-aminopropionamide are not particularly good, considerable quantities of side products are produced and the isolation of the desired pure product is difficult. Furthermore, under such conditions of operation the catalyst is usually inactivated before complete reduction is achieved.

In accordance with the present invention an improved method for catalytically reducing cyanoacetamide is provided which overcomes many of the difficulties encountered in the prior art processes. In carrying out the present invention the reduction of cyanoacetamide is facilitated by elimination of the sulfuric acid and replacement of the alcohol by acetic acid as the solvent. The most satisfactory yields, with commercial applicability, are best obtained, not by the usual method of hydrogenation, involving a mere simultaneous agitation of a mixture of all the substance to be reduced with a small amount of catalyst, but by gradual addition of cyanoacetamide to the reaction mixture at a rate controlled to prevent inactivation of the catalyst. Platinum oxide, the usual platinized or palladinized active charcoal, celite, or superfiltrol may be used. The preferred catalyst is one prepared by reducing palladium chloride in the presence of activated charcoal and an amount of anhydrous sodium acetate in excess of that required to react with the liberated hydrogen chloride.

The β-aminopropionamide produced by the above described process may be readily hydrolyzed to β-alanine by a method to be described more fully hereinafter.

The invention will be more fully described in conjunction with the following specific example. It should be understood, however, that the example is given merely by way of illustration and does not represent limiting values attained in application of the improved method herein described.

Example 1

A solution of 2.1 grams of cyanoacetamide in 45 cc. of glacial acetic acid was added, during 10 hours, to a catalyst prepared from 0.2 gram of palladium chloride, 0.8 gram of sodium acetate, 1 gram of charcoal and 50 cc. of glacial acetic acid. When the calculated volume of hydrogen (1200 cc.) had been absorbed, catalyst was filtered off, the filtrate was treated with a solution of 4 grams of hydrogen chloride in 100 cc. of glacial acetic acid and solvent was distilled in vacuo. The crystalline residue was extracted with 100 cc. of hot ethanol, insoluble solid (1.85 grams; M. P. 150–155° C.) was filtered off and re-extracted with hot ethanol. The inorganic solid (0.6 gram) was filtered off and the alcoholic extracts were concentrated gradually in vacuo. The hydrochloride (0.3 gram) separated in the first crystallization melted at 147–153° C. A total of 2.2 grams (70.7% yield) of the hydrochloride of β-aminopropionamide was obtained by the fractional crystallization of the crude product was directly applicable for further chemical work without purification.

The reaction described in Example 1 was carried out in an apparatus which comprised a reaction flask having an attached, modified dropping funnel; communication at the top, through flexible tubing, with a gasometer and with the reaction flask, through suitably arranged rigid tubing, to permit of equalization of the pressure within the system. The acetic acid solution of the cyanoacetamide was introduced into the dropping funnel and added gradually to the suspension of the catalyst.

Example 2

A solution of 5 grams of cyanoacetamide in 75 cc. of glacial acetic acid was added, during 19.5 hours, to the catalyst prepared from 0.5 gram of sodium acetate, 1 gram of activated charcoal, 0.2 gram of palladium chloride and 50 cc. of glacial acetic acid. When reduction stopped (2850 cc. of hydrogen absorbed; calculated volume 2880 cc.), catalyst was filtered off, solvent was distilled in vacuo and the residual oily product was digested at 100° C. for 4.5 hours with 30 cc. of concentrated hydrochloric acid diluted with 30 cc. of water. Solvent was evaporated in vacuo, the dry residue was extracted twice with hot isopropanol, inorganic products (3.1 grams) were filtered off and solvent was evaporated in vacuo from the filtrate. The residue was dissolved in a minimum of hot isopropanol, the insoluble ammonium chloride (0.1 gram) was filtered off and solvent was distilled in vacuo from the filtrate. The semi-solid residue was digested with 10 cc. of concentrated hydrochloric acid for 3 hours, solvent was evaporated in vacuo and the residue was recrystallized from hot isopropanol. The β-alanine hydrochloride (3.9 grams; 52% yield) melted at 123–124° C.

In the foregoing examples a specific type of apparatus was described for carrying out the reaction. The invention, however, is not limited to the use of such an apparatus. The reaction may be carried out in any suitable apparatus which will permit the solution of cyanoacetamide in glacial acetic acid to be added to the suspension of the catalyst in small amounts while hydrogen is being passed through the reaction mixture. The rate of addition will vary somewhat depending upon the relative strength of the solutions employed. In most instances, however, the addition of the cyanoacetamide to the suspension of the catalyst is completed in from about 6 to 12 hours. The concentration of the cyanoacetamide solution may be varied over wide limits. The best results are obtained, however, with dilute solutions and complete reduction is more readily achieved when the rate of addition of the nitrile is so controlled that the concentration of unreduced material in the presence of the catalyst is kept at a minimum.

In the example the hydrochlorides of β-aminopropionamide and β-alanine were isolated and this is the preferred method. However, if desired, the amide and β-alanine may be isolated in the form of other salts, for example, sulfate, perchlorate, picrate, or the like, and the free compounds may be obtained from these salts by treatment with a suitable base.

What I claim is:

1. The process of producing β-aminopropionamide which comprises reducing cyanoacetamide in an acetic acid solution, the reduction being carried out by the gradual addition, at such a rate that there is no substantial inactivation of the catalyst, of the cyanoacetamide solution to a mixture comprising a hydrogenation catalyst and hydrogen.

2. The process of producing β-alanine which comprises catalytically reducing cyanoacetamide in an acetic acid solution, the hydrogenation being carried out by the gradual addition, at such a rate that there is no substantial inactivation of the catalyst, of the cyanoacetamide solution to a mixture comprising a hydrogenation catalyst and hydrogen to product β-aminopropionamide and hydrolyzing the β-aminopropionamide to give β-alanine.

3. The process which comprises slowly adding, at such a rate that there is no substantial inactivation of the catalyst, an acetic acid solution of cyanoacetamide to a suspension of a hydrogen catalyst in acetic acid and effecting reduction of the cyanoacetamide to β-aminopropionamide.

4. The process which comprises slowly adding, at such a rate that there is no substantial inactivation of the catalyst, an acetic acid solution of cyanoacetamide to a suspension of a hydrogen catalyst in acetic acid and effecting reduction of the cyanoacetamide to β-aminopropionamide and hydrolyzing the β-aminopropionamide to β-alanine.

5. The process according to claim 3 in which a palladium catalyst is employed.

6. The process according to claim 4 in which a palladium catalyst is employed.

7. The process according to claim 3 in which the β-aminopropionamide is converted to the hydrochloride.

8. The process according to claim 4 in which the β-alanine is converted to the hydrochloride.

GUSTAF H. CARLSON.